United States Patent [19]

Inoue et al.

[11] Patent Number: 6,042,748
[45] Date of Patent: Mar. 28, 2000

[54] REGENERATING METHOD AND SYSTEM FOR FLUORESCENT MATERIAL

[75] Inventors: Kiyoshi Inoue, Tokyo; Tsutomu Ishii, Shimada; Mitsuhiro Oikawa, Yokohama; Yoshifumi Chujo, Shizuoka-Ken, all of Japan

[73] Assignee: Kabushiki Kaisha Toshiba, Kawasaki, Japan

[21] Appl. No.: 09/019,802

[22] Filed: Feb. 6, 1998

[30] Foreign Application Priority Data

Feb. 7, 1997 [JP] Japan .................................. 9-024726
Mar. 18, 1997 [JP] Japan .................................. 9-063684
Jul. 25, 1997 [JP] Japan .................................. 9-199479

[51] Int. Cl.$^7$ ........................... C09K 11/08; C09K 11/56; B08B 13/00
[52] U.S. Cl. ............. 252/301.4 S; 134/60; 252/301.4 R; 252/301.6 S; 427/68; 427/345; 516/89
[58] Field of Search .................................. 516/89; 427/68, 427/345; 134/60; 252/301.4 R, 301.4 S

[56] References Cited

U.S. PATENT DOCUMENTS

| | | | |
|---|---|---|---|
| 3,625,659 | 12/1971 | Hammond et al. | 252/301.4 R X |
| 3,647,522 | 3/1972 | Single | 427/68 X |
| 3,864,273 | 2/1975 | Forbes et al. | 252/301.4 R |
| 4,853,254 | 8/1989 | Wolfe | 427/68 X |
| 4,886,082 | 12/1989 | Kato et al. | 134/60 |
| 5,107,874 | 4/1992 | Flanigan et al. | 134/60 |
| 5,330,791 | 7/1994 | Aihara et al. | 427/68 X |
| 5,418,005 | 5/1995 | Endo et al. | 427/68 X |
| 5,435,938 | 7/1995 | Bando et al. | 427/68 X |

FOREIGN PATENT DOCUMENTS 2-504160 11/1990 Japan .
2-504162 11/1990 Japan .

*Primary Examiner*—Richard D. Lovering
*Attorney, Agent, or Firm*—Oblon, Spivak, McClelland, Maier & Neustadt, P.C.

[57] ABSTRACT

A method for regenerating a fluorescent material from a recovered phosphor slurry characterized by including a chemical washing step wherein a hypochlorite and a periodate are used; a carbon removing step for floating carbon in the supernatant liquid by the use of ammonia thereby removing the carbon; an acid washing step; and a heat treating step in this order as well as a system for regenerating a fluorescent material comprising means for effecting the aforesaid steps. From this constitution, it becomes possible that impurities are easily and effectively removed from the recovered phosphor slurry, whereby a fluorescent material providing excellent luminance and excellent grade of phosphor film can be regenerated.

14 Claims, 2 Drawing Sheets

REGENERATING METHOD AND SYSTEM FOR FLUORESCENT MATERIAL

BACKGROUND OF THE INVENTION

1. Field of the Invention

The present invention relates to a method and a system for recovering an extra fluorescent material (phosphor) produced in a step for coating phosphor screens of color image receiving tubes, and purifying the fluorescent material for recycle and reuse thereof, and more particularly to a method and a system for easily and simply effecting the above described purification at the manufacturing location of such color image receiving tubes.

2. Description of the Related Art

Color image receiving tube (color picture tube, color television picture tube) is manufactured through steps of preparing fluorescent material (phosphor) slurries of red, green, and blue colors being three primary colors, respectively, and applying these slurries to predetermined dot-shaped or stripe-shaped positions on phosphor screen, thereby forming phosphor film. In this case, a large amount of extra phosphor slurries are produced, and when such extra phosphor slurries are dumped without any consideration, it is not only wasteful of resources and manufacturing cost, but also it is affected adversely in view of safeguard for environment. Typically, rare earth fluorescent materials used as red fluorescent material, for example, a fluorescent material represented by $Y_2O_2S:Eu$ is expensive, so that reuse of the material after recovering the same is important for reducing the manufacturing cost of color image receiving tube.

However, these phosphor slurries contain additives such as carbon (dag), pigments, polyvinyl alcohol, chromium compounds such as bichromates and dispersants in addition to fluorescent materials. Furthermore, there is such a case where inclusion of fluorescent materials having different colors deteriorate color-developing characteristics of the fluorescent material to be reused in case of recovery thereof. In order to remove these additives and the fluorescent materials having different colors, very complicated steps are required in recovery and reuse of fluorescent material. In this respect, any simple and efficient regenerating or recycling method by which a fluorescent material can be purified up to a satisfactory degree could have not yet been found.

For instance, Japanese Patent Application Laid-Open No. 51-131486 discloses a regenerating or recycling method for fluorescent materials (phosphors) wherein a recovered fluorescent material containing a photosensitive binder prepared by dispersing a bichromate into polyvinyl alcohol is treated with an oxidizing agent, and examples of the oxidizing agent include hydrogen peroxide, alkali peroxide, periodic acid and the salts thereof, perchloric acid and the salts thereof, hypochlorous acid and the salts thereof, peroxosulfuric acid and the salts thereof, bichromates and the like.

In Japanese Patent Application Laid-Open No. 51-149186, disclosed is a regenerating or recycling method for fluorescent materials wherein tannic acid is added to a recovered fluorescent material containing graphite and chromium compounds, the resulting mixture is heat-treated at a temperature of 400 to 600° C., whereby the graphite is oxidized to vaporize away the same as carbon dioxide, and the remaining oxide is washed with water to remove the same.

Among the impurities contained in the above described recovered fluorescent materials, particularly, carbon exhibits black color so that it absorbs easily light rays, and therefore emission luminance of fluorescent material is remarkably reduced in the case where such carbon remains in the regenerated fluorescent material. Furthermore, since carbon is chemically stable, it is difficult to dissolve or decolor the recovered fluorescent material by reacting carbon with any material in accordance with any chemical treatment, and accordingly, it is required to separate carbon from the fluorescent material to remove the same in regenerating process.

Other than a method for washing simply a recovered fluorescent material with water for separating and removing carbon from the fluorescent material, disclosed are a method wherein a recovered fluorescent material is treated with an oxidizing material such as periodic acid and the salts thereof, and sodium hypochlorite, and then the material so treated is washed with water (Japanese Patent Preliminary Publication Nos. 2-504160 and 2-504162), a method wherein a recovered fluorescent material is subjected to reduction treatment, and then the material so treated is washed with water (Japanese Patent Application Laid-Open No. 63-154784) and the like methods. Any of these methods is efficient for separating and removing carbon at a certain degree.

In recent years, however, with increase in strict demand for emission luminance of color image receiving tube, improvements in luminance of phosphor which decides the luminance of color image receiving tube are required, while regenerated and recycled fluorescent material has been used as a part of raw fluorescent material. For this reason, improvements in characteristic properties of the regenerated fluorescent material are increasingly required. For such recent requirement of improvements in characteristic properties of regenerated fluorescent material, the above described conventional methods are insufficient for the one for removing carbon from the regenerated fluorescent material.

Japanese Patent Application Laid-Open No. 53-51190 discloses a method wherein for removing included sulfide fluorescent materials from recovered rare earth fluorescent materials, a specified amount of silver ion is reacted with the sulfide fluorescent materials.

Japanese Patent Application Laid-Open No. 53-52052 discloses a method for regenerating fluorescent materials characterized in that recovered $Y_2O_2S$ fluorescent materials are subjected to acid washing and water washing, and then the resulting slurry is treated with a solution containing polyvinyl alcohol and ammonium bichromate, or with a solution prepared by adding further acrylic emulsion thereto without drying the slurry. Moreover, as an improved method of the above described one, Japanese Patent Application Laid-Open No. 53-53588 discloses a method for treating a recovered fluorescent material with a solution prepared by adding further an anionic surfactant to the above described solution to prevent inclusion of other fluorescent materials.

In Japanese Patent Preliminary Publication No. 2-504160, a method wherein periodate is used for removing an organic polymer such as polyvinyl alcohol stuck to a recovered fluorescent material as well as a method wherein chromium compounds existing in the aforesaid fluorescent material are permitted to dissolve into water by the use of an aqueous solution of an oxidizing material such as sodium hypochlorite, ammonium peroxodisulfate, and hydrogen peroxide, whereby the resulting solution is removed are disclosed. Furthermore, Japanese Patent Preliminary Publication No. 2-504162 discloses a method for recovering organic contaminants from a recovered phosphor slurry without requiring a calcining or sintering step by employing the above described method.

However, an individual method of the above described methods is insufficient for recovering an extra phosphor slurry produced in a step for coating a phosphor screen and removing a variety of substances contained in the slurry to regenerate the phosphor, while a mere combination of these methods only brings about complicated steps. Particularly, organic materials such as polyvinyl alcohol and carbon cannot be completely removed, so that a fluorescent material having reusable characteristics cannot efficiently be obtained. For this reason, luminance and grade of coating film in a phosphor screen manufactured by employing the regenerated fluorescent material are adversely affected.

Furthermore, there arises a necessity for regenerating or recycling a recovered phosphor slurry in a image receiving tube manufacturing plant without spending labor and cost for long distance transportation of such slurry instead of conducting concentratively regenerating treatment of the recovered phosphor slurry. In this respect, a simple regenerating method of fluorescent material for satisfying the above described necessity is demanded, but the purpose therefor could have not been attained by the combination of conventional methods as mentioned above.

On the other hand, the regenerating treatment as described above is carried out usually by such a manner that a recovered phosphor slurry is successively agitated, admixed, and washed with each of aqueous solutions of the above described chemicals in a variety of agitation tanks. Although it is also possible to treat such recovered phosphor slurry at normal temperatures, the treatment is mostly conducted with the use of hot aqueous solutions for elevating washing effect. For this reason, a mild steel material on the surface of which had been coated with polyvinyl chloride, polypropylene, or had been applied glass lining has been heretofore used for a tank body for the agitation tank and a baffle (baffle plate) disposed in the tank for elevating agitating efficiency, and such baffles have been fixed to the tank body by means of welding or bolting.

Such conventional agitation tank as described above has involved the following problems.

(1) Baffles have been prepared separately from tank bodies and the former has been mounted on the latter, and in this connection, the working and mounting therefor are troublesome.

(2) Mounted portions of baffles are liable to be loaded, and such portions are easily damaged.

(3) Fluorescent material is easily stuck to and deposited on the mounted portions of baffles.

(4) Protecting tubes for protecting a drain tube, a level sensor and the like to be inserted into a tank from agitation flow are necessary, and mounting for such protecting tubes are troublesome as same as in the case of mounting for baffles.

(5) Agitating effect for liquid into which has been dispersed a fluorescent material is not sufficient.

In addition to the above described problems, polyvinyl chloride used for a surface coating of mild steel has a poor heat resistance, so that the polyvinyl chloride surface coating is corroded with hot aqueous solution. On one hand, polypropylene exhibits poor workability. Further, glass lining is easily attacked by aqueous alkaline solution in addition to exhibiting poor impact resistance. Other problems than those described above are such that sections to which such surface coating as described above is applied hardly are corroded with aqueous chemical solutions to be used, and the like problems.

SUMMARY OF THE INVENTION

A first object of the present invention is to provide a method and system for regenerating a fluorescent material having satisfactory characteristics, particularly excellent luminance and excellent phosphor film grade in accordance with a simpler and more effective manner than that of the prior art wherein polyvinyl alcohol, chromium compounds, carbon, fluorescent materials having the other colors as well as other organic and inorganic substances are removed from a recovered phosphor slurry.

A second object of the present invention is to provide a system for regenerating a fluorescent material wherein agitating efficiency of a liquid into which have been dispersed fluorescent materials, particularly the efficiency due to convection in vertical direction is elevated, besides drain tubes, level sensors and the like to be inserted into a tank are protected.

As a result of repeated study by the present inventors for achieving the above described objects, it has been attained by such discovery that a chemical treating step of a recovered phosphor slurry with a hypochlorite and a periodate is followed by a carbon removing step by means of aqueous ammonia, and then, steps of acid washing and heat treatment follow thereto, so that the present invention has been completed.

More specifically, the method for regenerating a fluorescent material according to the present invention wherein an extra fluorescent material produced in a coating step for the phosphor screen of an image receiving tube is recovered and recycled is characterized by comprising the steps of:

(a) a chemical washing step for decomposing impurities contained in a recovered phosphor slurry with the use of a hypochlorite and a periodate to remove the impurities;

(b) a carbon removing step for adding aqueous ammonia to the phosphor slurry and agitating the admixture, then, allowing the same to stand thereby floating carbon in a supernatant liquid, and removing the carbon contained in the supernatant liquid;

(c) an acid washing step for washing the phosphor slurry with hydrochloric acid or nitric acid; and (d) a heat treating step for heat-treating the phosphor slurry at a temperature of from 350 to 600° C. after filtering and drying the phosphor slurry at need.

Furthermore, in the method for regenerating a fluorescent material according to the present invention, the above described steps (a) to (d) may be additionally followed by one or two or more of (e) a pigment sticking step for sticking a pigment to particle surfaces of the fluorescent material by the use of an adhesive, (f) a dispersion step for dispersing the fluorescent material, and (g) a surface treating step for treating the particle surfaces of the fluorescent material with a modifier.

When the regenerating method of a fluorescent material comprising the above described steps (a) to (d) is applied to regenerating of a red fluorescent material, it is especially effective. This regenerating method may be combined with regenerating methods for green and blue fluorescent materials to utilize them for regenerating of one set of fluorescent materials which are employed for the phosphor screen of a color image receiving tube.

Accordingly, the other method for regenerating a fluorescent material according to the present invention relates to the one wherein an extra fluorescent material produced in a coating step for the phosphor screen of a color image receiving tube is recovered and regenerated is characterized by comprising the steps of:

(a) a chemical washing step for decomposing impurities contained in a recovered red phosphor slurry with the use of a hypochlorite and a periodate to remove the impurities;

(b) a carbon removing step for adding aqueous ammonia to the red phosphor slurry and agitating the admixture, then, allowing the same to stand thereby floating carbon in a supernatant liquid, and removing the carbon contained in the supernatant liquid;

(c) an acid washing step for washing the red phosphor slurry with hydrochloric acid or nitric acid; and (d) a heat treating step for heat-treating the red phosphor slurry at a temperature of from 350 to 600° C. after filtering and drying the red phosphor slurry at need; as well as (h) a warm water washing step for washing a green phosphor slurry and a blue phosphor slurry with warm water having a temperature of from 50 to 90° C., respectively;

(i) a heat treating step for heat-treating the green phosphor slurry and the blue phosphor slurry at a temperature of from 350 to 600° C. after filtering and drying the green phosphor slurry and the blue phosphor slurry, respectively, at need; and (j) an acid washing step for washing the green phosphor slurry and the blue phosphor slurry thus heat-treated with an acid, respectively.

Moreover, the system for regenerating a fluorescent material according to the present invention wherein an extra fluorescent material produced in a coating step for the phosphor screen of a color image receiving tube is recovered and regenerated is characterized by comprising:

(A) a chemical washing tank for decomposing impurities contained in a recovered phosphor slurry with the use of a hypochlorite and a periodate to remove the impurities;

(B) a carbon removing tank for adding aqueous ammonia to the phosphor slurry and agitating the admixture, then, allowing the same to stand thereby floating carbon in a supernatant liquid, and removing the carbon contained in the supernatant liquid;

(C) an acid washing tank for washing the phosphor slurry with hydrochloric acid or nitric acid; and (D) a heat treating device for heat-treating the phosphor slurry at a temperature of from 350 to 600° C. after filtering and drying the phosphor slurry at need.

Furthermore, it is preferred that at least one tank of the above described chemical washing tank, carbon removing tank, and acid washing tank is an agitation tank the inside of which is provided with an agitating means and baffles, and at least one of the baffles contains an upper opening and a lower opening opened towards the interior of the tank, respectively, and a hollow section communicating with both the openings.

DESCRIPTION OF THE PREFERRED EMBODIMENTS

Figure 1:
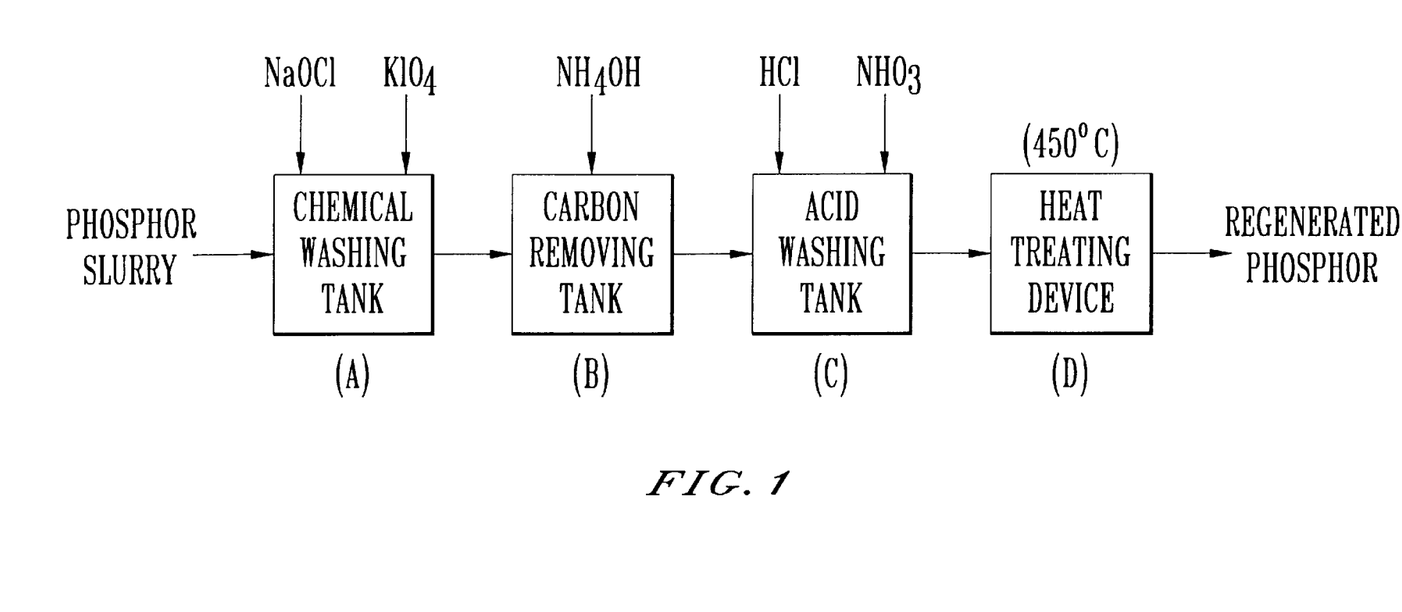
FIG. 1 is a conceptual diagram showing the system for regenerating a fluorescent material according to the present invention.

As shown in the conceptual diagram of FIG. 1, the regenerating system of a fluorescent material according to the present invention is constituted by including at least the chemical washing tank, carbon removing tank, acid washing tank and the heat treatment device represented by reference characters (A) to (D) having the functions corresponding to the above-mentioned steps (a) to (d), respectively. It is to be noted that the compounds used in a treatment and the heat-treating temperatures in FIG. 1 are typical examples. Furthermore, the tanks and the device (A) to (D) may have any specific structures and constitutions so far as they exhibit their essential functions, respectively.

For instance, the carbon removing tank (B) may be a single tank, or an agitation tank may be separately disposed from a standing-removing tank, and these two types of tanks may be arranged to perform functions of the tank (B) so far as these modified tanks (or a tank) maintain(s) the functions of adding aqueous ammonia to a phosphor slurry and agitating the admixture, then, allowing the same to stand thereby floating carbon in a supernatant liquid, and removing the carbon contained in the supernatant liquid. In the present invention, any types of fluorescent material (phosphor) and a mixture of a plurality of fluorescent materials can be treated.

Figure 2:
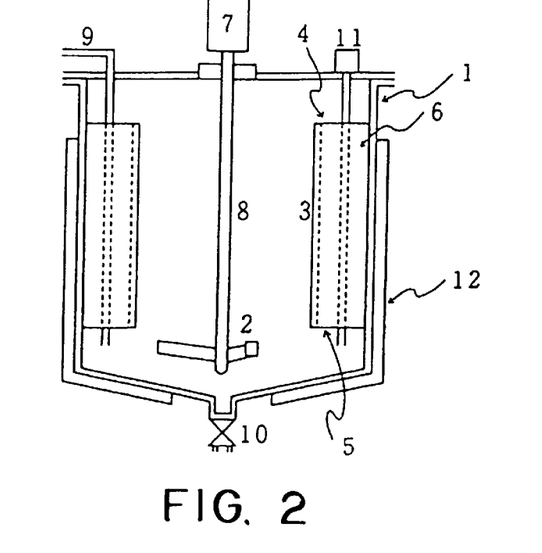
FIG. 2 is a schematic sectional view showing an agitation tank used in the system according to the present invention.
Figure 3:
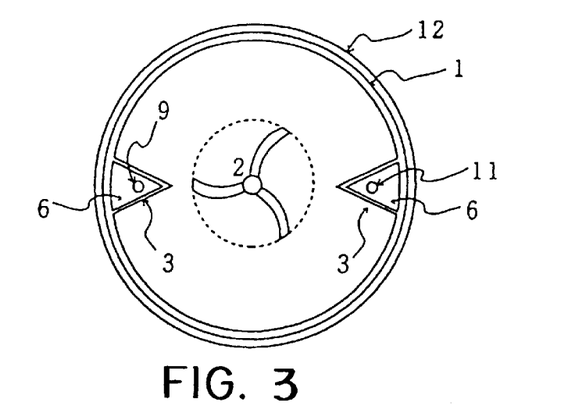
FIG. 3 is a sectional view, in the horizontal direction, showing a tank body of the agitation tank used in the system according to the present invention.

Agitation tanks such as a chemical washing tank, a carbon removing tank, an acid washing tank and the like used in the present invention are the ones shown typically in the schematic view of FIG. 2 and the tank body thereof is shown in the sectional view, along the horizontal direction, of FIG. 3 wherein the inside of the tank body 1 is provided with an agitating means such as a stirrer 2, and baffles 3. The characteristic feature of the agitation tank used in the present invention is in that at least one of the baffles 3 is not a mere plate-like baffle which is commonly utilized, but the one contains openings 4 and 5 which are opened towards the interior of the tank at the upper and lower positions thereof, respectively, and a hollow section 6 communicating with both the openings is formed inside the baffle. Such baffle will be hereinafter referred to as "hollow baffle" in the present specification.

The directions of the openings 4 and 5 formed in the hollow baffle may be vertical direction, or any other directions, for example, the direction towards the center of the tank, but the vertical direction is desirable, because of such reasons that the structure thereof becomes simple, that convection of the liquid causes effectively, that no deposition of a fluorescent material and the like occurs, and that cleaning of the interior of a tank is easy.

Figure 4:
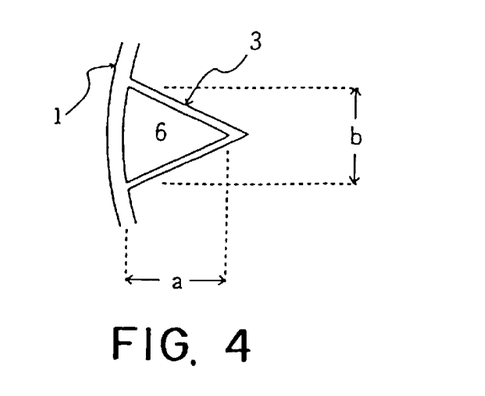
FIG. 4 is an explanatory view showing the dimension of a hollow baffle.

A shape in the cross section of a hollow section may take any shape such as triangular, quadrilateral, circular, semicircular shape, and another shape included in the above enumerated shapes and which contains further either a circular arc-shaped side being in contact with the internal wall of a tank body or a circular arc-shaped side constituting a part of the inner wall, and the like shapes, but a triangular shape (either a side of the hollow section being in contact with the internal wall of the tank body or a side of the former constituting a part of the inner wall of the latter may be a circular arc-shape) is preferable, and an equilateral triangle in section wherein the sides towards the center of a tank are equal to each other as shown in FIG. 4 is more preferable, because of such reasons that since the structure is simple, fabrication and installation thereof are easy, that agitating effect in the tank is good and liquid flow from the bottom to the upper part of a hollow section through the same is effectively produced, and that satisfactory strength of the baffle during agitation is obtained.

Moreover, in view of agitating effect and strength of baffle, it is preferred to install the baffle 3 in accordance with such a manner that either it is in contact with the inner wall of a tank body, or one side of the hollow section constitutes a part of the inner wall of the tank. A dimension of the hollow section, i.e., a distance defined between the inner wall side and the farthest side from the inner wall being indicated by a reference character a in FIG. 4 ranges preferably from 2 to 25%, and more preferably ranges from 5 to 15% of the inside diameter of a tank body. By this arrangement, effective convection in vertical direction is attained, so that high agitating effect can be obtained.

Although such hollow baffle may be mounted vertically at an arbitrary height along the inner wall of a tank, it is preferred to install the hollow baffle in order to obtain sufficient convection effect in such that the lower opening is positioned at a height which is slightly higher than a position of the surface of a fluorescent material layer formed by sedimentation thereof under a stationary condition, while the upper opening is positioned either at a slightly higher than the liquid level during agitation or in the vicinity of the liquid level.

The outer wall surface of the hollow baffle in a tank may be a vertically flat surface, and further branch-shaped projections by which a fluorescent material is not stuck or deposited may be provided in order to elevate agitating effect along the vertical direction in the tank at need.

A drain tube(s), an air supplying tube(s), a suction tube(s), a thermometer, a level sensor and the like which are to be inserted in a tank may be passed through the hollow baffle 3 as described above. By this arrangement, troublesome separate mounting of protecting tubes for protecting the above enumerated tubes and the like from agitating flow can be avoided.

In the agitation tank used in the present invention, although the hollow baffle 3 may be separately fabricated and mounted to the tank body 1, preferable is one-piece molding with the tank body, whereby troublesome mounting of the hollow baffle can be avoided, and an agitation tank for fluorescent material can be economically manufactured.

An arbitrary material may be used for the tank body 1 of the agitation tank employed in the present invention in response to the type of washing agent to be utilized and use conditions therefor, but it is preferable to use fiber reinforced plastics (hereinafter referred to as "FRP") in view of reasons of having such chemical resistance by which the tank body can be used in a washing step by the use of an aqueous solution of acid, base or oxidizing substance the temperature range of which extends from normal temperature to 90° C., having excellent workability, being capable of one-piece molding with the hollow baffle 3 which is a characteristic feature of the washing tank according to the present invention, and being capable of designing, the hollow baffle into an arbitrary shape.

An example of such fibers includes carbon fiber, silicon carbide fiber and the like in addition to glass fiber. A variety of types of fiber such as cloth, roving, and strand may be employed. An example of resins includes thermosetting resins such as unsaturated polyester, and epoxy resin; and heat resistant resins such as polyimide.

Although the agitating means used for an agitation tank is arbitrary as far as it is suitable for admixing a fluorescent material (phosphor slurry) with a chemical solution or water for washing the fluorescent material, the stirrer 2 which is driven by a power source such as an agitating motor 7 disposed outside the tank through a shaft 8 is usually employed. An example of types of the stirrer includes propeller type, paddle type, foudler type, anchor type, scraper vane type, and the combinations thereof. Any type of stirrer can be arbitrarily selected in response to an amount and fluidity of fluorescent material.

Baffles of conventional plate-like one may be employed in an agitation tank in combination with the above-mentioned hollow baffle(s) at need. Furthermore, any suitable parts and attachments mounted commonly to an agitation tank such as a liquid supply tube, an exhaust port, the drain tube 9, a slurry discharging port 10, the level sensor 11, a thermometer, a jacket 12 for heating and/or cooling use, a reflux condenser and the like may be provided at need.

Since an agitation tank in the system according to the present invention is provided with the hollow baffle as mentioned above, the tank produces such liquid flow into which has dispersed a fluorescent material and which directs from the bottom to the upper part of the tank through the hollow section of the aforesaid baffle, whereby convection current is produced in the washing tank so that sufficient agitating effect can be obtained.

Next, a regenerating method applied principally to the regeneration of red fluorescent material being the core of the present invention and represented by $Y_2O_2S:Eu$ will be described in detail. It is to be noted that although there is a case when the respective steps mentioned in this regenerating method are applied to the regeneration for the other fluorescent materials in the present invention, the different points in such respective cases will be described in the necessary occasions.

An extra phosphor slurry produced in a coating step of the phosphor screen of a color image receiving tube is dispersed into deionized water at need, or further its solid content or foreign matters are removed by filtration from the dispersion at need, and then the resulting slurry is subjected to the chemical washing step (a). The chemical washing step is usually conducted in two stages.

In the first stage, a hypochlorite is added to the slurry, and the mixture is agitated, whereby chromium compounds such as ammonium bichromate existing in the slurry are decomposed to change the compounds into water-soluble substances, and then these substances are removed by water washing. An example of hypochlorites includes sodium hypochlorite, potassium hypochlorite, calcium hypochlorite and the like. The use of sodium hypochlorite is preferable, because of less influence upon the characteristic properties of fluorescent material, even if the fluorescent material contains sodium. An amount of a hypochlorite to be added depends upon an amount of the chromium compounds existing in the slurry, but it is usually within a range of from 30 to 70% by weight with respect to the solid content in the slurry. When an amount of hypochlorite is less than 30% by weight, decomposition of chromium compounds is insufficient, while even when it is used over 70% by weight, resulting in mere excessive use and no reasonable effect corresponding to the amount of hypochlorite used is expected.

Then, in the second stage, a periodate is added to the slurry and the resulting mixture is agitated, whereby organic compounds such as polyvinyl alcohol existing in the slurry are decomposed. An example of periodates includes ammonium periodate, lithium periodate, sodium periodate, potassium periodate and the like. In view of high decomposing effect, potassium periodate is preferred.

Although an amount of a periodate to be added depends upon an amount of the organic compounds existing in the slurry, it is usually within a range of from 0.5 to 2.0% by weight with respect to the solid content in the slurry. When an amount is less than 0.5% by weight, decomposition of the organic compounds is not sufficient, while even when more than 2.0% by weight of a periodate is employed, reasonable effect cannot be expected. A material such as potassium periodate being slightly soluble in water at normal temperature is used after dissolving the same into hot water having a temperature of, for example, 70 to 90° C.

In the carbon removing step (b), carbon dispersed in a slurry is removed. More specifically, aqueous ammonia is added to the slurry to which had been applied the chemical washing step (a), and the resulting mixture is agitated, thereafter it is allowed to stand.

In the above case, a manner for adding ammonia ($NH_3$) may be either such that a fluorescent material is dispersed in water, and then an ammonia solution is added thereto, or such that a dilute ammonia solution has been previously prepared, and a fluorescent material is dispersed thereinto. In either of the above adding manners, the same effect can be obtained.

As the water to be used in this case, demineralized water such as deionized water, and distilled water is preferable. Further, dispersion of a fluorescent material may be carried out by such a manner that the fluorescent material is agitated in water in, for example, a processing tank provided with an agitator at an arbitrary temperature such as normal temperature. An amount of water ranges usually from 100 to 2,000 parts by weight, and preferably 200 to 1,000 parts by weight with respect to 100 parts by weight of a fluorescent material (as a result of conversion as pure material in case of containing moisture and impurities).

The step (b) is the one for adding an ammonia solution to a phosphor dispersion to separate carbon from the fluorescent material. As the ammonia solution, an aqueous solution is commonly employed. An amount of ammonia solution to be added is from 0.05 to 2.0 parts by weight, a and preferably from 0.1 to 0.5 part by weight of an ammonia component (as a result of conversion as pure material in case of containing moisture and impurities) with respect to 100 parts by weight of the fluorescent material. Addition of such ammonia solution is preferably carried out at a temperature of 20 to 30° C. Thus, a dilute aqueous ammonia having an ammonia concentration of preferably from 0.005 to 0.5% by weight, and more preferably from 0.1 to 0.25% by weight is prepared. After adding such ammonia solution, when agitation is continued for 30 minutes or more, carbon is separated from a fluorescent material.

After completing the agitation, the mixture is allowed to stand. The standing may be conducted at normal temperature. After the standing for 3 to 24 hours, the fluorescent material settles out, and carbon floats in the supernatant liquid. The supernatant liquid containing carbon is removed from the system, and water washing is carried out at need. Since specific gravity and particle diameter differ in carbon and fluorescent material from one another, the fluorescent material settles out and is deposited on the bottom of a processing tank, while the carbon floats in the supernatant liquid. The standing is continued usually at a temperature of from 20 to 30° C. for 3 hours or more although the condition depends upon its scale.

An operation for separating the fluorescent material from the supernatant liquid containing carbon produced as a result of standing the dispersion may be practiced by a manner such as decantation, but it is desirable to discharge the supernatant liquid containing carbon by the use of a pump from the upper part of the processing tank for performing effective separation in a narrow space.

The fluorescent material thus obtained may be further washed with water at need. For water washing, preferable is to use demineralized water such as deionized water, and distilled water. Although the separation of aqueous phase after the water washing and the standing may be carried out by decantation, it is preferred to discharge the supernatant liquid by means of a pump because of the reason as mentioned above. After the water washing, drying may be effected at need.

In the acid washing step (c), other fluorescent materials such as ZnS fluorescent materials contained in $Y_2O_2S$ or $Y_2O_3$ materials, in other words, green and blue fluorescent materials included in a red fluorescent material are removed. In this case, hydrochloric acid or nitric acid is used as the acid, and two stage method wherein hydrochloric acid is used in the first stage, and nitric acid is used in the second stage is preferred.

More specifically, in the first stage, for example, from 20 to 40% by weight of hot aqueous hydrochloric acid having a temperature of from 70 to 90° C. is added to the solid content in a slurry as HCl component, and the resulting mixture is agitated for 60 to 120 minutes. After standing the mixture, the supernatant liquid is discarded, and the remaining portion is washed with water.

In the second stage, for example, from 3 to 10% by weight of aqueous nitric acid solution is added to the solid content in a slurry as $HNO_3$ component, and the resulting mixture is agitated for 40 to 90 minutes. After standing the mixture, the supernatant liquid is discarded, and the remaining portion is washed with water. The water washing is carried out usually by the use of deionized water, and the washing is repeated until a pH of the slurry reaches a value of 5.5 or more.

The washed slurry is then filtered to take out the solid content, and it is dried. The drying is continued, for example, at about 140° C. for 20 hours, whereby moisture is completely removed.

Then, remaining organic materials are thermally decomposed in accordance with the heat-treating step (d) to remove the same. The heat treatment is conducted at a temperature of from 300 to 600° C., and preferably from 450 to 500° C., more specifically, it is carried out, for example, at 450° C. for preferably 8 hours or more. Thereafter, the remaining portion is washed with water or an aqueous acid solution at need, whereby organic materials which have still remained as well as impurities which have been included in case of heat treatment may be removed.

When the above described steps (a) to (d) are combined with each other in this order, recovered fluorescent materials, particularly rare earth fluorescent materials such as $Y_2O_2S$ fluorescent materials, typically red fluorescent material is regenerated, whereby a regenerated fluorescent material which can be reused is obtained. Furthermore, when at least one or two or more of the other steps are additionally implemented at need, a regenerated fluorescent material having more excellent characteristic properties can be prepared. In the following, the steps (e) to (g) which can be arbitrarily added to the above described steps will be described.

The fluorescent material to which had been subjected the step (d) may be further subjected to the pigment sticking step (e). Dependent upon fluorescent materials, there is a case where pigments such as red oxide which had been stuck to the surface of a red fluorescent material, and cobalt blue which had been stuck to the surface of a blue fluorescent material have peeled off in the steps of (a) to (d) after the recovery thereof, respectively, and thus, sufficient characteristic properties cannot be obtained from such fluorescent materials without taking any supplementary procedure.

For this reason, a paint prepared by dispersing a pigment such as red oxide or cobalt blue selected dependent upon types of fluorescent material into an adhesive such as acrylic resin emulsion is coated on the surface of a fluorescent material, and the resin is cured by aging or heating to fix the pigment on the surface of the fluorescent material.

When a fluorescent material to which had been subjected the step (d) and/or the step (e) is further subjected to the dispersion step (f), agglomerated phosphor particles can be dispersed completely. For instance, 0.5 to 2 times (weight) larger amount of deionized water and 1.5 to 3 times larger amount of glass beads are added to the fluorescent material, and torque is applied by means of a milling device to disperse the fluorescent material. If required, a dispersant such as surfactant may be added the above mixture. After the dispersing treatment, the dispersed fluorescent material can be taken out by filtration.

A modifier may be applied further by means of the surface treating step (g) to the surface of the fluorescent material to which had been subjected the step (d), the step (e) and/or the step (f). An example of the modifier includes inorganic materials such as silica, and zinc silicate; and organic polymers such as polyacrylic acid, and hydroxypropyl cellulose. These modifiers may be used alone or in combination thereof, and they are selected dependent upon a purpose and a grade to be required in respect of surface treatment.

As an example of the silica, finely divided particulate silica such as colloidal silica is exemplified. Although an amount of modifier to be added differs dependent upon types and purposes therefor, it is preferred to add a modifier in such that the solid content becomes 0.01 to 0.1% by weight of a fluorescent material in the form of dispersion in water in the case where the fluorescent material is treated with colloidal silica.

Such fluorescent material to which had been subjected the above enumerated steps (a) to (d), and further to which had been subjected at least any one or two or more of the steps (e) to (g) is finally purified in accordance with ordinary manners such as filtration, drying and/or sifting, whereby it can be used as a regenerated or recycled fluorescent material.

While the above-mentioned regenerating method is applicable to any type of fluorescent material, it is effective for applying to $Y_2O_2S$ fluorescent materials, particularly effective for either red fluorescent materials such as $Y_2O_2S:Eu$, and $Y_2O_3:Eu$, or green fluorescent materials such as $Y_2O_2S:Tb$, and $Gd_2O_2S:Tb$. The present invention is the one wherein the above described manners are applied to regenerate or recycle of rare earth red fluorescent materials, and the invention includes further that all the fluorescent materials of three primary colors which are used for fluorescent materials of color image receiving tube are regenerated as a result of combining applications for the following manners to be applied to green fluorescent materials and blue fluorescent materials belonging to the other systems.

As a regenerating method for a green fluorescent material represented by ZnS:Cu, Al and ZnS:Cu, Au, Al as well as for a blue fluorescent material represented by ZnS:Ag and ZnS:Ag, Cl, each method of them characterized by including the warm water washing step (h), the heat-treating step (i), and the acid washing step (j) in this order is preferable.

The warm water washing step (h) is the one wherein a slurry containing a fluorescent material is agitated in the presence of warm water having a temperature of 30 to 80° C., e.g., 70° C., whereby water-soluble materials such as polyvinyl alcohol, and chromium compounds contained in the recovered slurry are removed. The warm water washing step is preferably repeated several times, for example, four times.

The heat-treating step (i) is the one wherein organic substances and carbon contained in a slurry are decomposed to remove the same by calcining the slurry at a temperature of from 350 to 600° C., and preferably form 450 to 500° C. as in the case mentioned above for, for example, 10 hours.

The acid washing step (j) is the one wherein a fluorescent material is dispersed into water such as deionized water, then an acid such as dilute sulfuric acid is added to the dispersion, whereby the pH of the mixture is adjusted to, for example, 4.0 to 4.5, and then the so adjusted mixture is agitated to remove oxides existing on the surface of the fluorescent material. After such acid washing, the slurry is allowed to stand to remove the supernatant liquid, and thereafter water washing is repeated.

In case of green fluorescent materials, a material to which had been subjected the step (j) may be further subjected to either or both of the dispersing step (f) and the surface treating step (g) in the above described order. The dispersing step (f) is the one as mentioned above, and the surface treating step (g) is preferably carried out with the use of colloidal silica for elevating charging characteristic properties.

In case of blue fluorescent materials, a material to which had been subjected the step (j) may be additionally subjected to either at least one, or two or more of the pigment sticking step (d), the dispersing step (f), and the surface treating step (g) in this order. The pigment sticking step (e) is the same as that mentioned above except that a blue pigment such as cobalt blue is used as the pigment. The dispersing step (f) is the same as that mentioned above, and in the surface treating step (g), hydroxypropyl cellulose is preferably employed as a modifier in order to prevent agglomeration.

In also these green and blue fluorescent materials, such a fluorescent material to which had been subjected the above enumerated steps (h), (i), and (j), and further to which had been subjected at least any one or two or more of the steps (e) to (g) is finally purified in accordance with ordinary manners such as filtration, drying and/or sifting, whereby it can be used as a regenerated fluorescent material.

In the following, the present invention will be more specifically described in conjunction with Examples and Comparative Examples. However, it is to be noted that the present invention is not limited by these Examples. In the Examples and Comparative Examples, all the "parts" are indicated by "parts by weight", and "%" used in composition and ratio of incorporation is indicated by "% by weight" otherwise specified.

EXAMPLE 1

Regeneration of Red Fluorescent Material ($Y_2O_2S:Eu$)

60 parts by weight, as solid content, of a phosphor slurry which was recovered in a coating step for the phosphor screen of a color image receiving tube and contains red fluorescent material $Y_2O_2S:Eu$ together with other additional materials and impurities were weighed, and an agitation tank was charged therewith. 200 parts of deionized water were added into the agitation tank, and the mixture was agitated for 60 minutes to completely disperse the slurry into the water. The resulting dispersion was passed through a nylon cloth of 100 mesh to remove foreign matters contained in the slurry, and then the slurry was settled to remove the aqueous phase outside the system.

(a) Chemical Washing Step

The above described slurry was transferred to the agitation tank, and to which were added 500 parts of deionized water and 18.8 parts of aqueous sodium hypochlorite containing 5% of chlorine component, and the resulting admixture was agitated for 3 hours, whereby chromium compounds existing in the slurry were oxidatively decomposed. Thereafter, water washing was repeated three times with the use of deionized water.

Then, 400 parts of deionized water of 80° C. and 0.28 part of potassium periodate were added to the slurry thus treated, and the admixture was agitated for 1 hour to decompose polyvinyl alcohol existing in the slurry. The slurry was allowed to stand to settle the same, and then the aqueous phase was removed outside the system.

(b) Carbon Removing Step

To the slurry remained in the agitation tank were added 400 parts of deionized water and 0.31 part of 28% aqueous ammonia solution to agitate the admixture at normal temperature for 30 minutes. Then, the admixture was allowed to stand for 10 hours to settle the slurry, and the supernatant liquid was removed together with carbon floating in the supernatant liquid outside the system.

(c) Acid Washing Step

To the slurry remained in the agitation tank were added 400 parts of warm water of 70° C. and 18.7 parts of 35% aqueous hydrochloric acid solution to agitate the mixture for 2 hours. Thereafter, the so agitated mixture was permitted to stand to settle the slurry, and then the aqueous phase is removed outside the system. The remaining part was subjected to water washing two times with 400 parts each of deionized water.

To the slurry remained in the agitation tank were added 400 parts of deionized water and 4 parts of concentrated nitric acid to agitate the mixture for 30 minutes. Thereafter, the so agitated mixture was allowed to stand to settle the slurry, and then the aqueous phase was removed outside the system. Then, water washing was repeated with the use of 800 parts each of deionized water, and nine times of water washing were carried out until pH of the slurry reaches 5.5 or a higher value.

The slurry after washing was filtered to take out the solid content, and then it was dried at 140° C. for 20 hours to obtain a phosphor powder.

(d) Heat Treating Step

The dried phosphor powder was placed in a quartz tray, and was heat-treated at 450° C. for 8 hours, whereby organic components remained in the fluorescent material were completely thermally decomposed to remove them.

Moreover, water washing was implemented five times with the use of deionized water in order to remove the impurities remained or included in the course of heat treatment.

(e) Pigment Sticking Step

As a result of analyzing a concentration of red oxide stuck to the surface of the resulting phosphor powder, it was confirmed that the value was insufficient as compared with a prescribed concentration of red oxide, since the red oxide was peeled off in the regenerating steps which had already been conducted. In these circumstances, a coating material prepared by the dispersing 0.05 part of red oxide 0.05 part of red oxide corresponding to the insufficient amount into 0.11 part of acrylic emulsion having 45% concentration was applied to the surface of the phosphor powder to fix the red oxide thereon.

(f) Dispersing Step

A milling device was charged with 40 parts of the fluorescent material onto the surface of which was stuck red oxide together with 40 parts of deionized water and 80 parts of glass beads, the admixture was agitated, and torque was applied thereto for 2 hours, whereby agglomerated phosphor particles were dispersed. Thereafter, the aqueous phase was removed by filtration, and further the glass beads were removed to obtain the dispersed phosphor particles.

(g) Surface Treating Step

An agitation tank was charged with the phosphor particles to which had been subjected the dispersing step, further to which were added deionized water and 0.02 part of colloidal silica (trade name "Catalloid" manufactured by Shokubai Kasei K. K.), and the mixture was agitated to stick silica fine powder onto the surface of the fluorescent material.

The slurry containing the surface treated phosphor particles was filtered, dried, and sifted to obtain a regenerated red fluorescent material.

Comparative Example 1

Regeneration of fluorescent material was carried out by the use of the same recovered phosphor slurry containing red fluorescent material ($Y_2O_2S$:Eu) according to the regenerating method described in Japanese Preliminary Publication No. 2-504162.

More specifically, the recovered slurry was suspended in an aqueous solution of potassium periodate, the suspension was agitated at a temperature of 80 for 10 hours, the suspension thus agitated was allowed to stand to settle the fluorescent material, and then water was removed outside the system. Thereafter, the remaining portion was subjected to water washing five times with the use of deionized water at a temperature of 80° C. Then, deionized water was added to the resulting solid content to agitate the mixture thereby preparing 25% dispersion of the fluorescent material, to which was added 0.5% of silica, and a pH of the dispersion was adjusted to 6 to 8 with the use of sodium hydroxide while continuing agitation. The resulting dispersion was permitted to stand to settle the fluorescent material, and the aqueous phase was removed outside the system. Thereafter, the settled fluorescent material was dried by heating it at 150° C. for 5 hours, and the so dried fluorescent material was sifted with a 500 mesh sieve to obtain a fluorescent material (phosphor).

Presence of Cr and Zn in the fluorescent material thus obtained was analyzed. As a result, it was found that these metals were remained. Accordingly, an agitation tank was charged with 25% of the fluorescent material, 3% of sodium hypochlorite, 1% of sodium hydroxide, and the rest of deionized water, the admixture was agitated to mix, and then was allowed to stand thereby settling the fluorescent material. Furthermore, water washing was repeated with the use of three times larger amount of cold deionized water with respect to the fluorescent material until a pH of the slurry reaches 10 or a lower value. To the resulting slurry was added an aqueous hydrochloric acid solution to adjust the pH to 2 to 5, and further water washing was repeated until the pH reaches 5 or more. This procedure was repeated until Cr and Zn were not detected. In addition, the pigment sticking step (e) and the following steps were implemented as in the case of Example 1, and as a result, a regenerated red fluorescent material was obtained.

Comparative Example 2

Regeneration of a fluorescent material was conducted by the use of the same recovered phosphor slurry employed in Example 1 according to the regenerating method described in Japanese Patent Application Laid-Open No. 53-52052.

Namely, the recovered slurry was centrifuged to obtain a solid content, was placed in a quartz tray, then heat-treated at 450° C. for 5 hours, the resulting solid content was loosened by means of a tumbling device, and further was heat-treated at 450° C. for 5 hours to decompose organic materials.

The remaining fluorescent material was immersed in 2% aqueous hydrochloric acid solution, agitated for 3 hours, then allowed to stand, and the supernatant liquid was removed outside the system, whereby included green and blue fluorescent materials were removed. The remaining portion was washed with deionized water, then introduced in an aqueous solution containing 2% of polyvinyl alcohol, 0.5% of ammonium bichromate, and 0.5% of acrylic emulsion, agitated for 1 hour, allowed to stand, and the supernatant liquid was removed. Thereafter, the procedure was followed by the steps (e) and (f) of Example 1, whereby a regenerated red fluorescent material was obtained.

Evaluation Example 1

With respect to the regenerated red fluorescent materials obtained in Example 1, Comparative Example 1, and Comparative Example 2 as well as a newly manufactured $Y_2O_2S:Eu$ red fluorescent material, luminance and reflectivity were determined, respectively, and further relative luminance and relative reflectivity were determined by considering the values of the regenerated red fluorescent material obtained in Example 1 as 100. Furthermore, the number of pin-holes in a phosphor film which was prepared by applying each of these fluorescent materials on a glass panel for Braun tube was determined. These results are shown in Table 1.

TABLE 1

| | Example 1 | Comparative Example 1 | Comparative Example 2 | Newly manufactured phosphor |
|---|---|---|---|---|
| Relative luminance (%) | 100 | 101 | 99 | 102 |
| Relative reflectivity (%) | 100 | 105 | 106 | 100 |
| Number of pinholes in phosphor film* | 21 | 22 | 21 | 23 |

(Note) *;per panel

EXAMPLE 2
Regeneration of Green Fluorescent Material (ZnS:Cu, Al)

60 parts, as solid content, of a phosphor slurry which was recovered in a coating step for the phosphor screen of a color image receiving tube and contains green fluorescent material ZnS:Cu, Al together with other additional materials and impurities were weighed, and an agitation tank was charged therewith. 200 parts of deionized water were added to the agitation tank, and the mixture was agitated for 60 minutes to completely disperse the slurry into the water. The resulting dispersion was passed through a nylon cloth of 100 mesh to remove a solid content and foreign matters contained in the slurry, and then the slurry was settled to remove the aqueous phase outside the system.

(h) Warm Water Washing Step

The agitation tank was charged with the slurry, to which were added 400 parts of warm water of 70° C., was agitated for 60 minutes, allowed to stand to settle the solid content, and the supernatant liquid was removed outside the system. This procedure was repeated four times, whereby polyvinyl alcohol, chromium compounds and the like dissolved into warm water were removed.

(i) Heat Treating Step

The slurry with respect to which had been completed the warm water washing was filtered, and dried to obtain a solid content. The resulting solid content was placed in a quartz tray, and heat-treated at 450° C. for 10 hours, whereby carbon and organic materials contained in the fluorescent material were decomposed, and they were removed.

(j) Acid Washing Step

The fluorescent material to which had been subjected the heat treating step was transferred to the agitation tank, 400 parts of deionized water were added thereto to agitate the mixture thereby dispersing the same into the liquid, then sulfuric acid was added thereto, whereby a pH of the slurry was adjusted to 4.5, the resulting mixture was agitated for 60 minutes, and further allowed to stand. The supernatant liquid was removed outside the system, whereby oxides on the surface of the fluorescent material were removed. Thereafter, washing with deionized water was repeated three times.

(g) Surface Treating Step 400 parts of deionized water were added to the fluorescent material to which had been subjected the acid washing step, and the mixture was agitated to sufficiently disperse the same. To which was added 0.018 part of colloidal silica (trade name "Catalloid" manufactured by Shokubai Kasei K. K.) while continuing agitation, and the agitation was carried out for 60 minutes.

The slurry was filtered, dried, and sifted to obtain a regenerated green fluorescent material.

Comparative Example 3

A recovered phosphor slurry containing the same green fluorescent material ZnS:Cu, Al as that used in Example 2 was employed, and the fluorescent material was regenerated according to the regenerating method described in Japanese Patent Application Laid-Open No. 51-149186. More specifically, 1% of aqueous tannic acid solution was added to the recovered slurry, the admixture was agitated, then permitted to stand, and the supernatant liquid was removed outside the system. The remaining solid content was heat-treated at 500° C. to remove carbon and organic materials. The procedure was followed by the surface treating step (g) and the final purification of Example 2 thereby obtaining a regenerated green fluorescent material.

Evaluation Example 2

With respect to the regenerated green fluorescent materials obtained in Example 2 and Comparative Example 3 as well as a newly manufactured ZnS:Cu, Al green fluorescent material, luminance was determined, respectively. Further each relative luminance was determined by considering the values of the regenerated green fluorescent material obtained in Example 2 as 100. Furthermore, the number of pin-holes in a phosphor film which was prepared by applying each of these fluorescent materials on a glass panel for Braun tube was determined. These results are shown in Table 2.

TABLE 2

| | Example 2 | Comparative Example 3 | Newly manufactured phosphor |
|---|---|---|---|
| Relative luminance | 100 | 99.5 | 103 |

TABLE 2-continued

|  | Example 2 | Comparative Example 3 | Newly manufactured phosphor |
|---|---|---|---|
| (%) Number of pinholes in phosphor film* | 24 | 85 | 27 |

(Note) *;per panel

EXAMPLE 3
Regeneration of Blue Fluorescent Material (ZnS:Ag)

60 parts, as solid content, of a phosphor slurry which was recovered in a coating step for the phosphor screen of a color image receiving tube and contains blue fluorescent material ZnS:Ag together with other additional materials and impurities were weighed. The phosphor slurry was subjected to wet sifting in accordance with the same manner as that of Example 2. Further, the resulting phosphor slurry was subjected to the warm water washing step (h), the heat-treating step (i), and the acid washing step (j) in accordance with the same manner as that of Example 2 except that the heat-treating condition in the step (i) was modified to 500° C. for 9 hours, and the pH of the slurry in the step (j) was modified to 4.0.

The fluorescent material thus obtained was further subjected to the pigment sticking step (e), the dispersing step (f), the surface treating step (g), and the final purification in accordance with the same manner as that of Example 1 except that the pigment used in the step (e) was changed to cobalt blue, the period for applying torque was modified to 40 minutes in the step (f), and the modifier was changed to hydroxypropyl cellulose in the step (g), whereby a regenerated blue fluorescent material was obtained.

Reference Example

As a result of employing the red, green, and blue regenerated fluorescent materials obtained in Examples 1, 2 and 3, respectively, in a step for coating phosphor screen, a color image receiving tube having the same quality as that wherein a newly manufactured fluorescent material has been employed was obtained.

Next, the characteristic properties of a fluorescent material aiming at efficiency for carbon removal will be further described specifically by referring to the following Examples and Comparative Examples.

A phosphor slurry which was recovered in a coating step for the phosphor screen of a color image receiving tube and contains red fluorescent material $Y_2O_2S:Eu$ together with other additional materials and impurities was employed. Amounts were indicated by those calculated in terms of pure materials. Otherwise specified, a fluorescent material which had been prepared by repeating five times the following procedure in such that 200 parts of the above described recovered red fluorescent material was washed with 600° C. parts of deionized water at about 25° C., and the supernatant liquid was removed by decantation was divided into two equal sections as common raw materials, and they were served for respective one pair of Comparative Example and Example.

Comparative Example 4 and Example 4

One of the equally sectioned recovered fluorescent material after the above-mentioned water washing was employed, and water washing was repeated further five times by the use of deionized water having the same ratio as that described above under the same condition to obtain a sample for Comparative Example 4.

A processing tank provided with an agitator was charged with 100 parts of the other sectioned fluorescent material, to which were added 400 parts of deionized water, and a dispersion was obtained by agitating the mixture. Furthermore, 1.5 part of 10% aqueous ammonia solution was added to the dispersion, agitation was continued at 25° C. for 1 hour, then the agitation was stopped, and allowed to stand to settle the fluorescent material. Thereafter, the supernatant liquid was discharged together with floating carbon by means of a pump. Washing with deionized water was repeated four times with respect to the remaining fluorescent material to obtain a sample for Example 4.

Comparative Example 5 and Example 5

To 100 parts of one of the fluorescent material equally divided into two sections were added 400 parts of deionized water and 0.2 part of 5% aqueous tannic acid solution, and the mixture was agitated at 25° C. for 30 minutes. Thereafter, the aqueous phase was removed therefrom by filtration, dried, and then heat-treated at 500° C. for 5 hours. After cooling the resulting material, water washing was repeated further five times to obtain a sample for Comparative Example 5.

100 parts of the other sectioned fluorescent material were used, and processed in accordance with the same manner as that of Example 4 except that an amount of 10% aqueous ammonia solution added was modified to 3.0 parts and the number of times for water washing was changed to five times, whereby a sample for Example 5 was obtained.

Comparative Example 6 and Example 6

For a pair of this experiments, equally divided into two sections of a fluorescent material prepared by conducting water washing therefor five times as mentioned above, thereafter filtering and drying the same, and heat-treating it at 500° C. for 5 hours were served.

100 parts of one section of the fluorescent material was washed with 400 parts each of warm water having 70° C. temperature ten times to obtain a sample for Comparative Example 6. The other sectioned fluorescent material was processed in accordance with the same manner as that of Example 4 to obtain a sample for Example 6.

Comparative Example 7 and Example 7

To 100 parts of one of the fluorescent material equally divided into two sections were added 400 parts of deionized water and 0.1 part of periodic acid, the resulting mixture was agitated for 2 hours, and then washed with water three times. To the filtered fluorescent material was added 0.1 part of sodium hypochlorite, the mixture was agitated for 2 hours, and then washed with water five times. Thereafter, the fluorescent material was dried at 150° C., and sieved to obtain a sample for Comparative Example 7.

100 parts of the other sectioned fluorescent material were used, and processed in accordance with the same manner as that of Example 4 except that an amount of 10% aqueous ammonia solution added was modified to 5.0 parts and the number of times for water washing was changed to ten times, whereby a sample for Example 7 was obtained.

Comparative Example 8 and Example 8

To 100 parts of one of the fluorescent material equally divided into two sections were added 400 parts of deionized water and 1.0 part of oxalic acid, and the mixture was agitated at 30° C. for 2 hours. Thereafter, the aqueous phase was removed therefrom by filtration, and the fluorescent material was washed with water five times to obtain a sample for Comparative Example 8.

The other sectioned fluorescent material was processed in accordance with the same manner as that of Example 2 to obtain a sample for Example 8.

Measurement of Reflectivity

Reflectivity of light rays having 450 nm wavelength was measured with respect to samples of Comparative Example 8 and Example 8. The reflectivity of the sample in Comparative Example 8 according to a conventional treating method was 67%, while the reflectivity of the sample in Example 8 according to the method of the present invention was 72%. Judging from the obtained results, it was clear that such regenerated fluorescent material having excellent reflectivity, i.e., high whiteness degree could be obtained.

Measurement of Luminance

Luminance was measured with respect to the samples in five pairs of the Comparative Examples and the Examples obtained as described above. Each luminance of a sample in each Example in the case when luminance of each sample in the corresponding Comparative Examples is considered to be 100 is as shown in Table 3, all the values of luminance in these Examples were more excellent than those of the Comparative Examples.

TABLE 3

| Comparative Example | Relative luminance | Example | Relative luminance |
|---|---|---|---|
| 4 | 100 | 4 | 105 |
| 5 | 100 | 5 | 108 |
| 6 | 100 | 6 | 107 |
| 7 | 100 | 7 | 104 |
| 8 | 100 | 8 | 106 |

As is apparent from Table 3, luminance of each of the fluorescent materials from which has been removed carbon according to Examples of the present invention is higher than that of each of the corresponding Comparative Examples.

According to the present invention, carbon can be effectively removed from a recovered fluorescent material, whereby the recovered fluorescent material having high reflectivity and high luminance can be obtained. Therefore, according to the present invention, a process for the removal of carbon proceeds efficiently, it is extremely useful for the regeneration of a fluorescent material recovered from a coating step for phosphor screen of a color image receiving tube, particularly for rare earth fluorescent materials such as $Y_2O_2S$:Eu, so that the present invention contributes remarkably to a rationalization for manufacturing color image receiving tubes.

Next, the system for regenerating a fluorescent material including an agitation tank having a specified structure according to the present invention will be described hereinafter by referring to the following Examples and Comparative Examples.

EXAMPLE 9

Prepared was a cylindrical agitation tank for a fluorescent material wherein a tank body 1 was made from glass fiber reinforced polyester resin, and two hollow baffles 3 were formed by one-piece molding in which each baffle holds one side thereof in common with the inner wall surface of the tank body, and has an upper opening 4 and a lower opening 5. A schematic diagram of the agitation tank is shown in FIG. 2, and a sectional view of the tank body in the horizontal direction is shown in FIG. 3, respectively.

The agitation tank was provided with a stirrer 2 driven by an agitation motor 7 through a shaft 8, a slurry discharging port 10, and a heating jacket 12, while a drain tube 9 and a level sensor 11 were disposed through hollow sections of the aforesaid respective hollow baffles. The hollow baffle 3 had a section as shown in FIG. 4 and which was an equilateral triangle one side of which holds in common with a part of the inner wall of the tank body and exhibits a circular arc-shape, while the dimension a of the hollow baffle in FIG. 4 corresponds to 10% of the inside diameter of the tank body and the dimension b is twice the dimension a.

To a phosphor slurry which had been recovered in a coating step for the phosphor screen of a color image receiving tube and contains red fluorescent material ($Y_2O_2S$:Eu) together with other additional materials and impurities was added deionized water, and filtered to remove the foreign matters. Thereafter, the above described agitation tank was charged with the aforesaid slurry 60 parts of which had been previously weighed as its solid content. To which were added 500 parts of deionized water and 18.8 parts of aqueous sodium hypochlorite solution containing 5% of chlorine component, the admixture was agitated at 80° C., whereby chromium compounds existing in the slurry were oxidatively decomposed. Thereafter, the resulting slurry was washed with 400 parts each of water.

Then, to the so washed slurry were added 400 parts of deionized water having 80° C. temperature, and 0.28 part of potassium periodate, and the mixture was agitated at 80° C., whereby polyvinyl alcohol existing in the slurry was decomposed. The so treated slurry was allowed to stand to settle the same, and then the aqueous phase was removed outside the system.

To the slurry remaining in the agitation tank were added 400 parts of deionized water and 0.31 part of 28% aqueous ammonia solution, and the admixture was agitated at normal temperature. Then, the slurry was settled, and the supernatant liquid was removed together with the carbon floating in the supernatant liquid outside the system.

To the slurry remained in the agitation tank were added 400 parts of 70° C. warm water and 18.7 parts of 35% aqueous hydrochloric acid solution, and the mixture was agitated. Thereafter, the so agitated mixture was allowed to stand to settle the slurry, then the aqueous phase was removed outside the system, and the resulting slurry was washed two times with 400 parts each of deionized water.

To the slurry remained in the agitation tank were added 400 parts of deionized water and 4 parts of concentrated nitric acid, and the admixture was agitated. Thereafter, the resulting admixture was permitted to stand to settle the slurry, and then the aqueous phase was removed outside the system. Thereafter, water washing was repeated by the use of 800 parts each of deionized water, and continued until the pH of the slurry reaches 5.5 or more. The slurry after washing was taken out, and filtered to obtain a solid content.

As a result of the observation of a liquid flow in the agitation tank during agitation throughout the above-mentioned processing and water washing steps, a violent liquid flow directing from the bottom to the upper portion of the tank through the hollow section of a baffle was confirmed. Due to this fact, a fluorescent material contained in the tank was violently flowing counter-currently against the liquid phase so that the agitating tank exhibited a sufficient agitating effect.

For this reason, it became possible to wash the fluorescent material in respective steps with agitation for a comparatively short period of time and a small number of times of water washing. Agitation periods of time for conducting completely washing in respective steps and the number of times for water washing in the final water washing step were as shown in Table 4.

Comparative Example 9

A washing tank for fluorescent material which was provided with the same means and parts as that of Example 9, i.e., the same tank body as that used in Example 9, and the same agitating means as well as other same accessories as those employed in Example 9 except that no hollow baffle was mounted was prepared. To the tank body of such washing tank were secured two plate-like baffles each having 90 mm width and made of vinyl chloride resin by bolting in such that agitation flow collides perpendicularly against the baffle. Furthermore, a drain tube, a thermometer, and a level sensor were installed in the tank by the use of a protecting tube.

The same slurry as the recovered red phosphor slurry used in Example 9 was employed, and the same processing and the same water washing as those of Example 9 were implemented. With respect to a liquid flow in the agitation tank during agitation, sufficient agitating effect in the vertical direction could not be obtained. Accordingly, when the results of experiments wherein the processing period of time and the number of times in water washing are varied were summarized, a longer agitation period of time as well as a larger number of times for water washing were required as shown in Table 4 for the sake of obtaining the same washing effect as that of Example 9. Moreover, deposition of the fluorescent material was observed on the mounted portions of baffles.

TABLE 4

|  |  | Example 9 | Comparative Example 9 |
|---|---|---|---|
| Sodium hypochlorite washing | (h) | 2 | 3 |
| Potassium periodate washing | (min) | 30 | 60 |
| Ammonia washing | (min) | 20 | 30 |
| Hydrochloric acid washing | (h) | 1.5 | 2 |
| Nitric acid washing | (min) | 20 | 30 |
| Final deionized water washing |  |  |  |
| Cycle time | (min) | 20 | 30 |
| Number of times | (times) | 8 | 9 |

According to the above described Examples of the present invention, a system for regenerating a fluorescent material exhibiting excellent agitating efficiency of the fluorescent material in the vertical direction of dispersed liquid in the agitating and washing steps of the fluorescent material can be obtained. Furthermore, when a drain tube, a level sensor and the like are contained in hollow sections of the hollow baffles, there is no need of providing separate protecting tubes, so that a structure in the tank can be simplified, besides there is no damage in the protecting tubes due to agitation.

Especially, when the hollow baffles are formed together with a tank body by one-piece molding, there is no adhering or deposition of a fluorescent material as in the case of a conventional washing tank, because there is no baffle mounting portion to which a fluorescent material adheres easily.

As described above, according to the present invention, a fluorescent material recovered in a coating step for the phosphor screen of a color image receiving tube can be regenerated into such fluorescent material having satisfactorily characteristic properties, particularly exhibiting excellent luminance and excellent grade of phosphor film on the phosphor screen of an image receiving tube in accordance with a method by which impurities can be efficiently removed and no forming tendency in slurry is accompanied.

Moreover, since the method of the present invention can be easily carried out by a simple system, such system can be equipped in a manufacturing plant for color image receiving tubes and can be easily operated, so that an advantage of reducing a transportation cost for regenerating fluorescent material can be attained.

In addition to the above described advantages, washing of fluorescent material, particularly agitation and washing for regenerating a recovered fluorescent material for color image receiving tube can be efficiently carried out in accordance with the regenerating system for fluorescent material of the present invention.

Accordingly, the present invention contributes significantly to rationalization for manufacturing color image receiving tubes.

What is claimed is:

1. A method for regenerating a fluorescent material wherein an extra fluorescent material produced in a coating step for the phosphor screen of an image receiving tube is recovered and regenerated, comprising the steps of:
   (a) a chemical washing step for decomposing impurities contained in a recovered phosphor slurry with the use of a hypochlorite and a periodate to remove the impurities;
   (b) a carbon removing step for adding aqueous ammonia to the phosphor slurry and agitating the admixture, then, allowing the same to stand thereby floating carbon in a supernatant liquid, and removing the carbon contained in the supernatant liquid;
   (c) an acid washing step for washing the phosphor slurry with hydrochloric acid or nitric acid; and
   (d) a heat treating step for heat-treating the phosphor slurry at a temperature of from 350 to 600° C. after filtering and drying the phosphor slurry at need.

2. The method for regenerating a fluorescent material as claimed in claim 1, further comprising (e) a pigment sticking step for sticking a pigment to particle surfaces of the fluorescent material by the use of an adhesive, following to said steps (a) to (d).

3. The method for regenerating a fluorescent material as claimed in claim 2, further comprising (f) a dispersing step for dispersing the fluorescent material, following to said steps (a) to (e).

4. The method for regenerating a fluorescent material as claimed in claim 2, further comprising (g) a surface treating step for treating particle surfaces of the fluorescent material with the use of a modifier, following to said steps (a) to (e).

5. The method for regenerating a fluorescent material as claimed in claim 1, wherein the fluorescent material is a red fluorescent material.

6. A method for regenerating a fluorescent material wherein an extra fluorescent material produced in a coating step for the phosphor screen of a color image receiving tube is recovered and regenerated, comprising the steps of:

(a) a chemical washing step for decomposing impurities contained in a recovered red phosphor slurry with the use of a hypochlorite and a periodate to remove the impurities;

(b) a carbon removing step for adding aqueous ammonia to the red, phosphor slurry and agitating the admixture, then, allowing the same to stand thereby floating carbon in a supernatant liquid, and removing the carbon contained in the supernatant liquid;

(c) an acid washing step for washing the red phosphor slurry with hydrochloric acid or nitric acid; and (d) a heat treating step for heat-treating the red phosphor slurry at a temperature of from 350 to 600° C. after filtering and drying the red phosphor slurry at need; as well as (h) a warm water washing step for washing a green phosphor slurry and a blue phosphor slurry with warm water having a temperature of from 50 to 90° C., respectively;

(i) a heat treating step for heat-treating the green phosphor slurry and the blue phosphor slurry at a temperature of from 350 to 600° C. after filtering and drying the green phosphor slurry and the blue phosphor slurry, respectively, at need; and (j) an acid washing step for washing the green phosphor slurry and the blue phosphor slurry thus heat-treated with an acid, respectively.

7. The method for regenerating a fluorescent material as claimed in claim 1 or 6, wherein the fluorescent material is agitated in an aqueous solution having an ammonia concentration ranging from 0.005 to 0.5% by weight in the step (b).

8. The method for regenerating a fluorescent material as claimed in claim 1 or 6, wherein the fluorescent material is $Y_2O_2S:Eu$.

9. A system for regenerating a fluorescent material wherein an extra fluorescent material produced in a coating step for the phosphor screen of an image receiving tube is recovered and regenerated, comprising:

(A) a chemical washing tank for decomposing impurities contained in a recovered phosphor slurry with the use of a hypochlorite and a periodate to remove the impurities;

(B) a carbon removing tank for adding aqueous ammonia to the phosphor slurry and agitating the admixture, then, allowing the same to stand thereby floating carbon in a supernatant liquid, and removing the carbon contained in the supernatant liquid;

(C) an acid washing tank for washing the phosphor slurry with hydrochloric acid or nitric acid; and (D) a heat treating device for heat-treating the phosphor slurry at a temperature of from 350 to 600° C. after filtering and drying the phosphor slurry at need.

10. The system for regenerating a fluorescent material as claimed in claim 9, wherein at least one tank of said chemical washing tank, said carbon removing tank, and said acid washing tank is an agitation tank the inside of which is provided with an agitating means and baffles, and at least one of the baffles contains an upper opening and a lower opening opened towards the interior of the tank, respectively, as well as a hollow section communicating with both the openings.

11. The system for regenerating a fluorescent material as claimed in claim 10, wherein said baffle is installed in such that either it is in contact with the inner wall of the tank, or one side of the hollow section constitutes a part of the inner wall of the tank, and a distance defined between the inner wall side of the hollow section in said baffle and the farthest side from the inner wall ranges from 2 to 25% with respect to the inside diameter of the tank body.

12. The system for regenerating a fluorescent material as claimed in claim 10, wherein said baffles are integrally molded with the tank body in one piece.

13. The system for regenerating a fluorescent material as claimed in claim 10, wherein said tank body is made from a fiber reinforced plastic.

14. The system for regenerating a fluorescent material as claimed in claim 10, wherein a liquid flow directing from the bottom to the upper part of said agitation tank is produced.

* * * * *